(12) United States Patent
Fayle

(10) Patent No.: US 11,105,720 B1
(45) Date of Patent: Aug. 31, 2021

(54) APPARATUS FOR APPLYING FORCE TO A WORKPIECE

(71) Applicant: Charles Fayle, Baytown, TX (US)

(72) Inventor: Charles Fayle, Baytown, TX (US)

( * ) Notice: Subject to any disclaimer, the term of this patent is extended or adjusted under 35 U.S.C. 154(b) by 120 days.

(21) Appl. No.: 16/406,394

(22) Filed: May 8, 2019

Related U.S. Application Data

(60) Provisional application No. 62/671,273, filed on May 14, 2018.

(51) Int. Cl.
*G01N 3/08* (2006.01)
*G01N 3/10* (2006.01)
*B66C 13/16* (2006.01)
*B66C 13/12* (2006.01)
*B66C 1/40* (2006.01)

(52) U.S. Cl.
CPC .............. *G01N 3/08* (2013.01); *B66C 1/40* (2013.01); *B66C 13/12* (2013.01); *B66C 13/16* (2013.01); *G01N 3/10* (2013.01)

(58) Field of Classification Search
CPC ... G01N 3/02; G01N 3/08; G01N 3/10; B66C 13/16; B66C 13/12; B66C 1/40
See application file for complete search history.

(56) References Cited

U.S. PATENT DOCUMENTS

| 2,555,633 A | * | 6/1951 | Comins | G01N 3/08 73/793 |
| 2007/0107534 A1 | * | 5/2007 | Lemmer | G01N 3/04 73/857 |
| 2014/0352451 A1 | * | 12/2014 | Kismarton | G01N 3/08 73/826 |
| 2014/0360283 A1 | | 12/2014 | Kawka et al. | |

\* cited by examiner

*Primary Examiner* — Benjamin R Schmitt
(74) *Attorney, Agent, or Firm* — Bushman Werner, P.C.

(57) ABSTRACT

An apparatus for applying force to a workpiece, the apparatus having a frame with spaced first and second side members and a top frame assembly. An anchor is spaced downwardly from the top frame assembly. There is a force generator connected to the frame assembly. The force generator is operative to apply a force to a workpiece connected between and to the force generator and anchor.

13 Claims, 12 Drawing Sheets

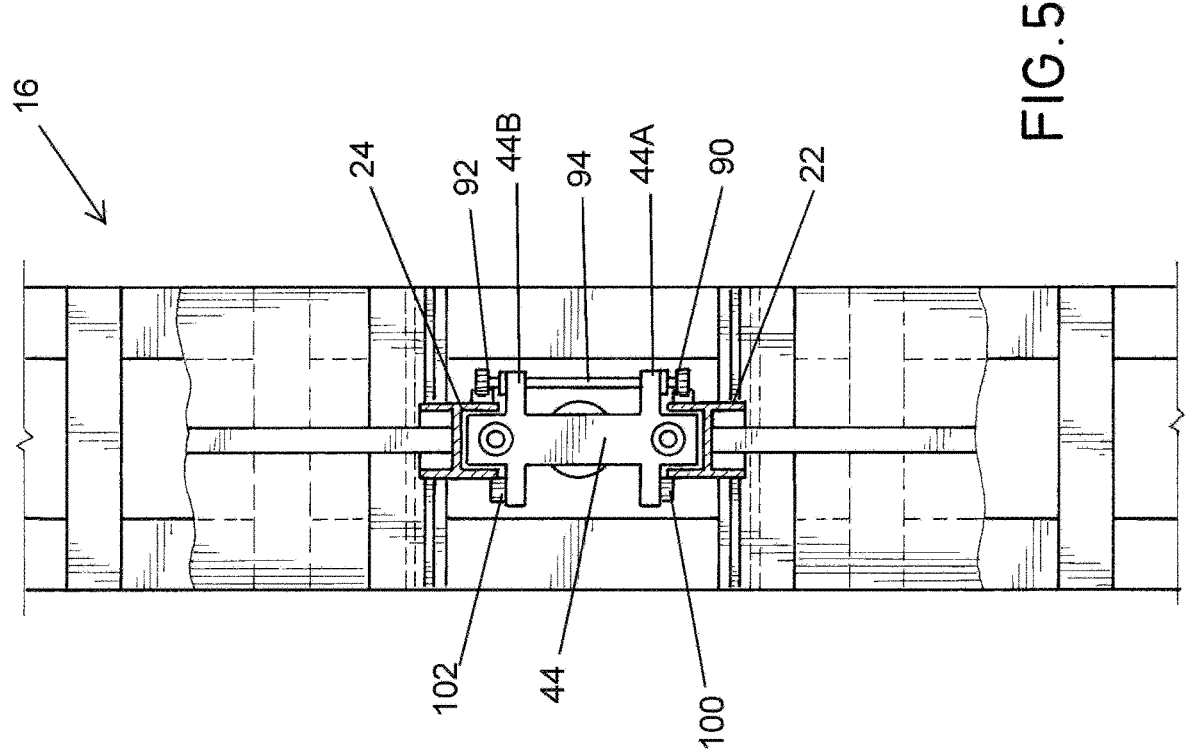
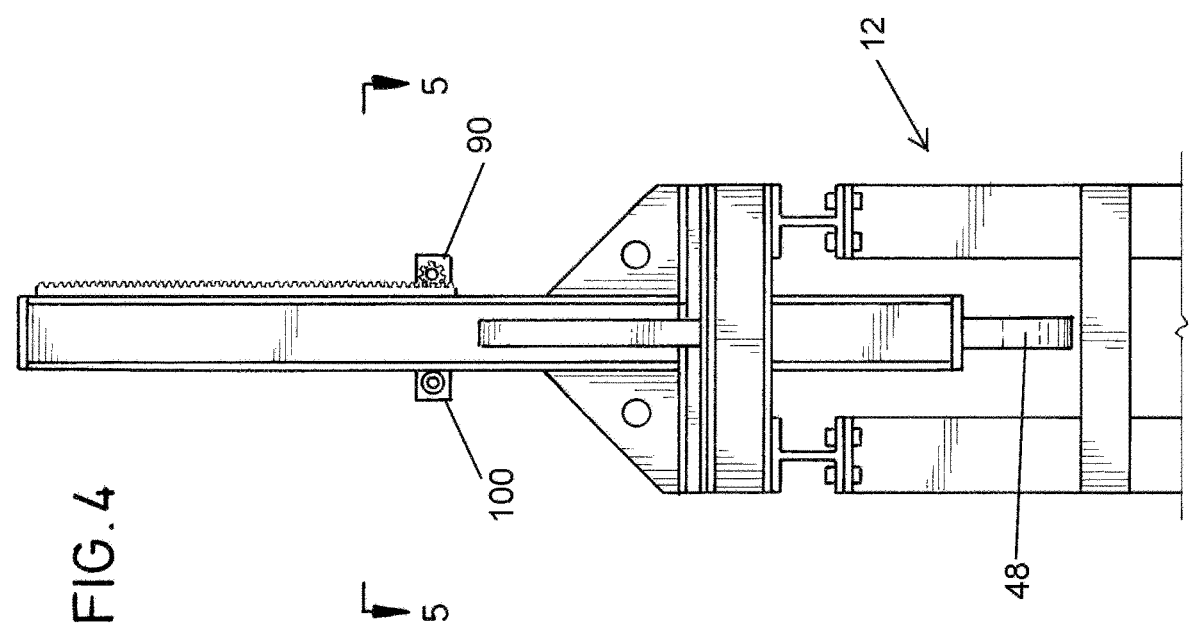

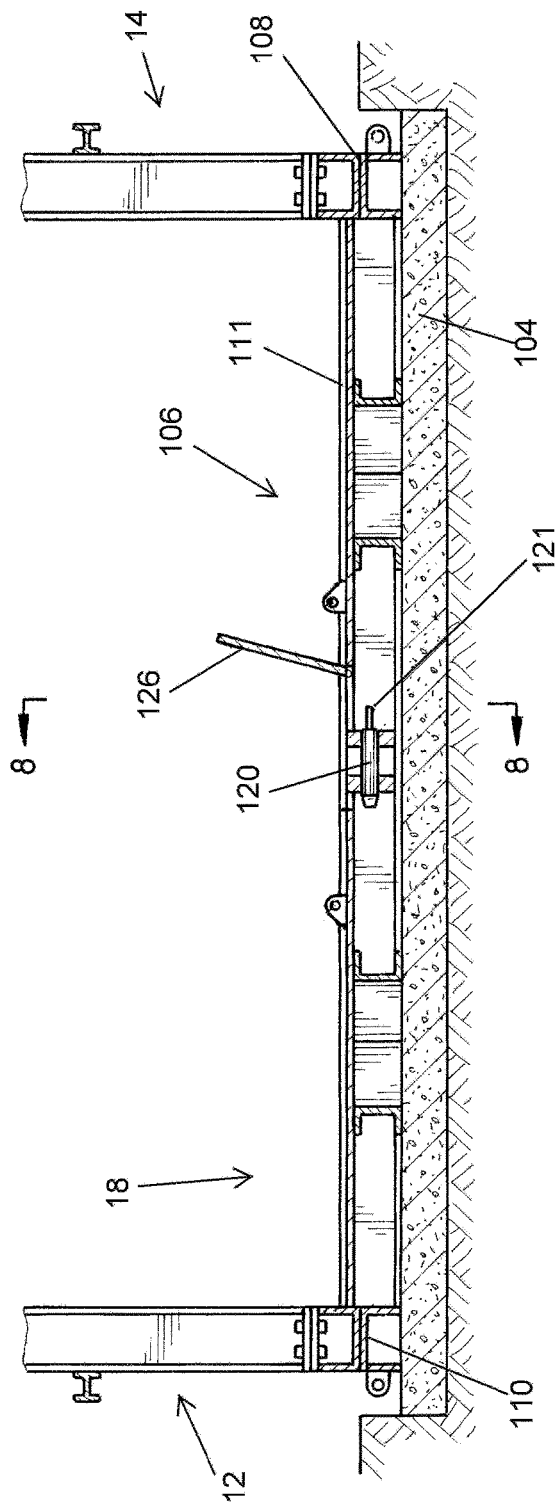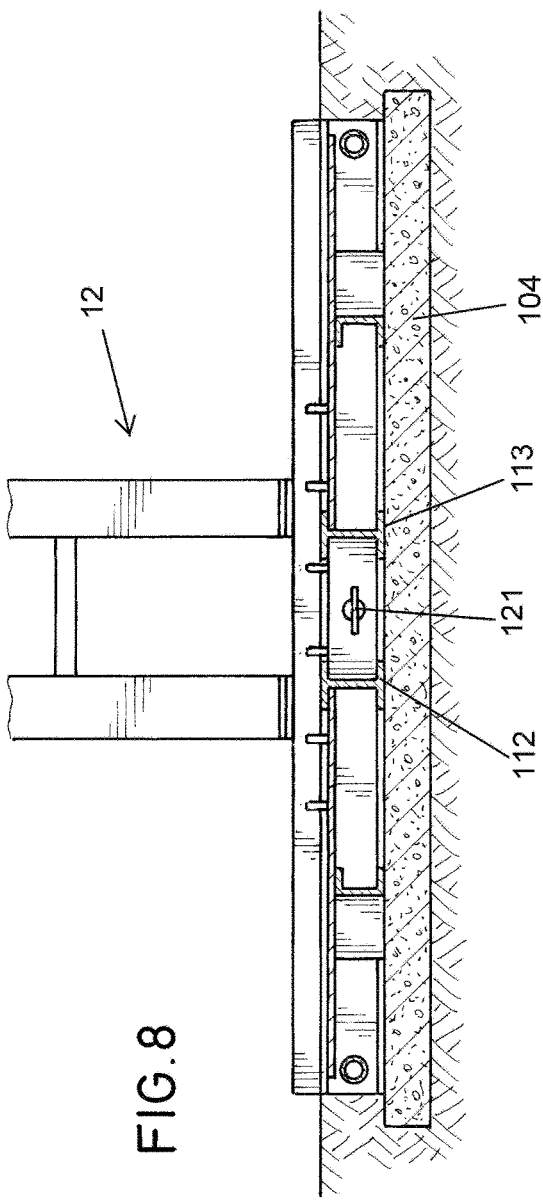

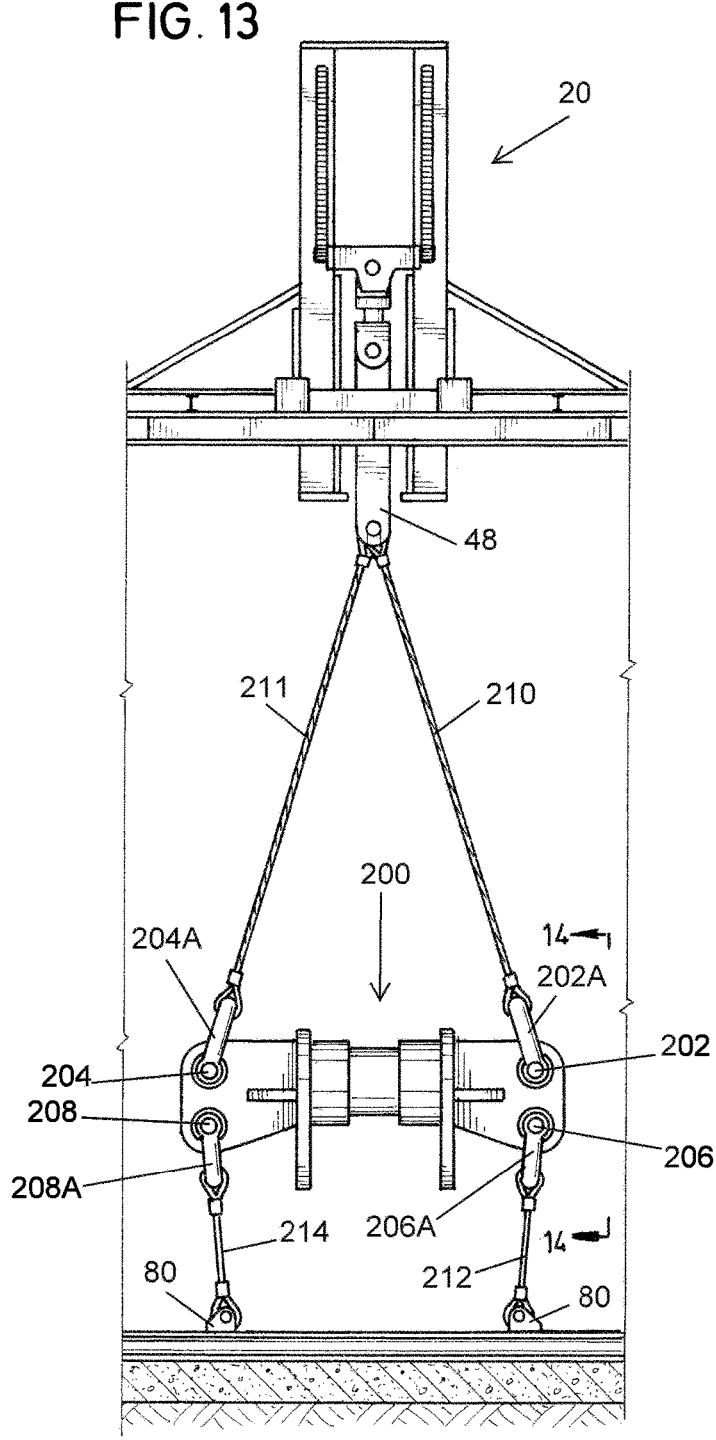
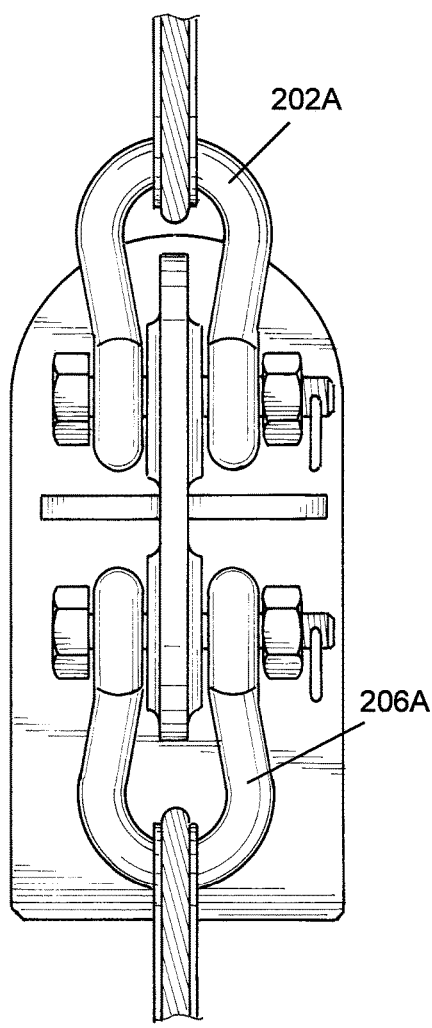
FIG. 13
FIG. 14

APPARATUS FOR APPLYING FORCE TO A WORKPIECE

FIELD OF THE INVENTION

The present invention relates to an apparatus for applying a force to a workpiece and, more particularly, to an apparatus for determining the structural strength of a workpiece or component(s) thereof.

BACKGROUND OF THE INVENTION

Tensile and compression testing are commonly used industrially to ascertain the ability of a workpiece or a portion thereof to withstand certain forces applied to the workpiece or a portion thereof.

By way of example, many heavy pieces of industrial machinery, shipping containers, etc. frequently have to be lifted and moved from one location to another, e.g., from a truck to its place of utility. Typically, these workpieces are provided with lifting lugs, padeyes, or other attachments/formations formed on or attached to the workpiece which are adapted to be grasped by hooks, shackles, grapples, cables, etc., and raised with a suitable lifting apparatus, e.g., a crane, so that the workpiece can be handled and positioned as needed.

By way of example, a wellhead assembly for use in oil and gas operations can weigh many thousands of pounds. Such wellhead assemblies are typically provided with padeyes whereby the wellhead assembly can be lifted, e.g., by a hoisting device such as a crane at the production facility and again at the well site. It is crucial that the padeye(s) and its attachment to the wellhead assembly be capable of undergoing a predetermined amount of tensile stress before it fails, e.g., to ensure that the padeye will not break loose from the wellhead assembly during any lifting procedures.

In still other instances, it may be desirable or necessary to determine the compressive force to which a hollow cylindrical workpiece can be subjected before it collapses, or is at least deformed.

SUMMARY OF THE INVENTION

In one aspect, the present invention relates to an apparatus for applying a vertical force to a workpiece or component thereof.

In another aspect, the present invention relates to an apparatus which can apply both tensile and/or compressive forces to a workpiece or component thereof.

These and further features and advantages of the present invention will become apparent from the following detailed description, wherein reference is made to the figures in the accompanying drawings.

BRIEF DESCRIPTION OF THE DRAWINGS

FIG. 4 is a side elevational view of the upper portion of the apparatus shown in FIG. 2.

FIG. 5 is a view taken along the lines 5-5 of FIG. 4.

FIG. 7 is a view taken along the lines 7-7 of FIG. 6.

FIG. 8 is a view taken along the lines 8-8 of FIG. 7.

FIG. 13 shows the apparatus of the present invention testing a spreader bar.

FIG. 14 is a view taken along the lines 14-14 of FIG. 13.

DETAILED DESCRIPTION OF PREFERRED EMBODIMENTS

The term "workpiece" as used herein includes any object, thing, structure, piece of machinery, piece of equipment, padeye, hook, shackle, bar, beam, tubular member, or any other thing which is or has at least a portion thereof subject to tension and/or compressive forces while being used, transferred, lifted, or subjected to any other activity.

Figure 1:
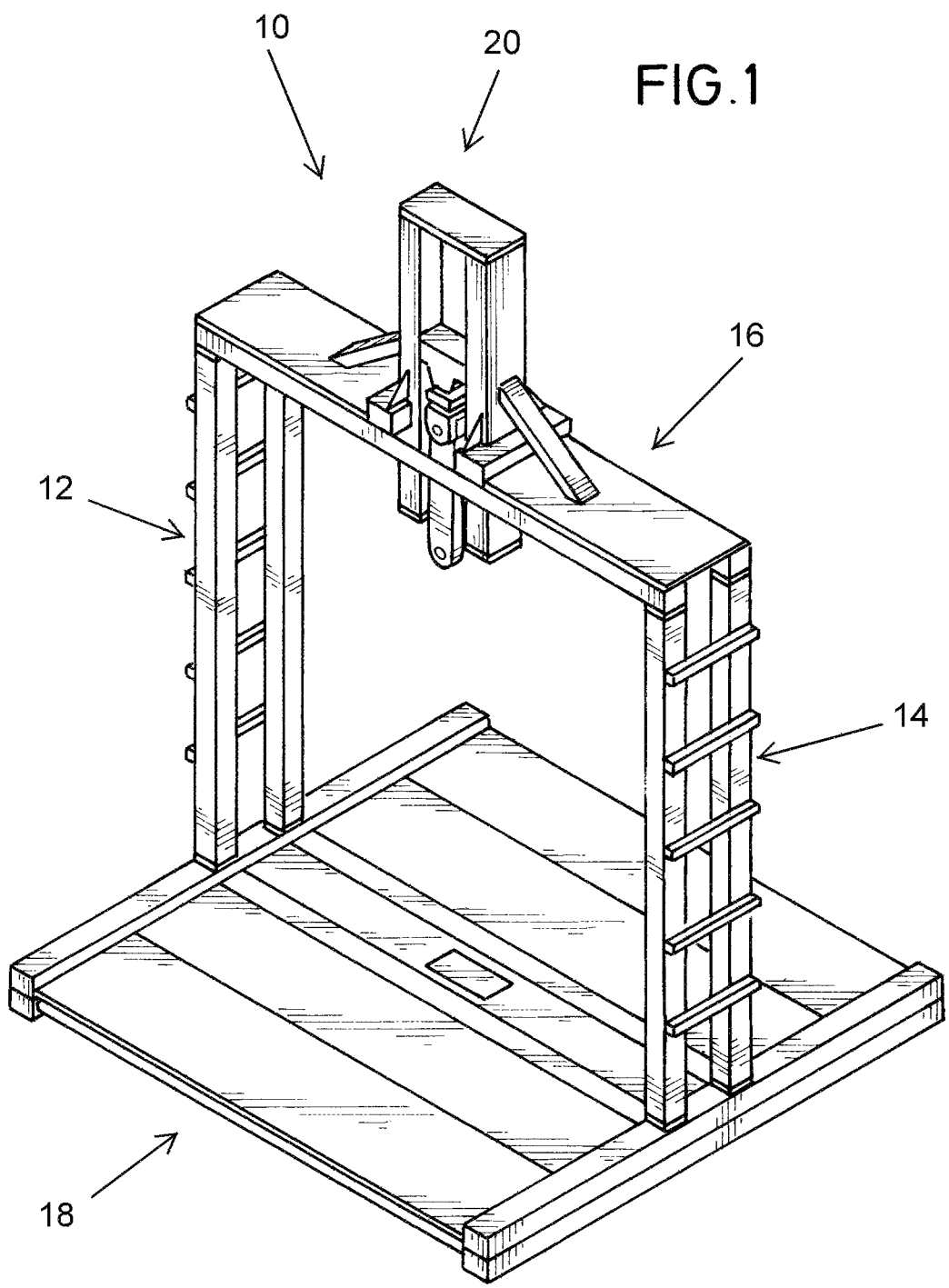
FIG. 1 is a simplified perspective view of one embodiment of the apparatus of the present invention.

Referring first to FIG. 1, one embodiment of the apparatus of the present invention, shown generally as 10, comprises first and second spaced side frame members or columns 12 and 14, and frame assembly 16, which is connected to the upper ends of side members 12 and 14. Apparatus 10 can also include a base 18 to which side members 12 and 14 are connected. As shown hereafter, there are a series of anchors connected to base 18, albeit that in its simplest version a single anchor could be employed. Secured to frame assembly 16 is a force generator or tensioning assembly shown generally as 20 and described more fully below.

Figure 2:
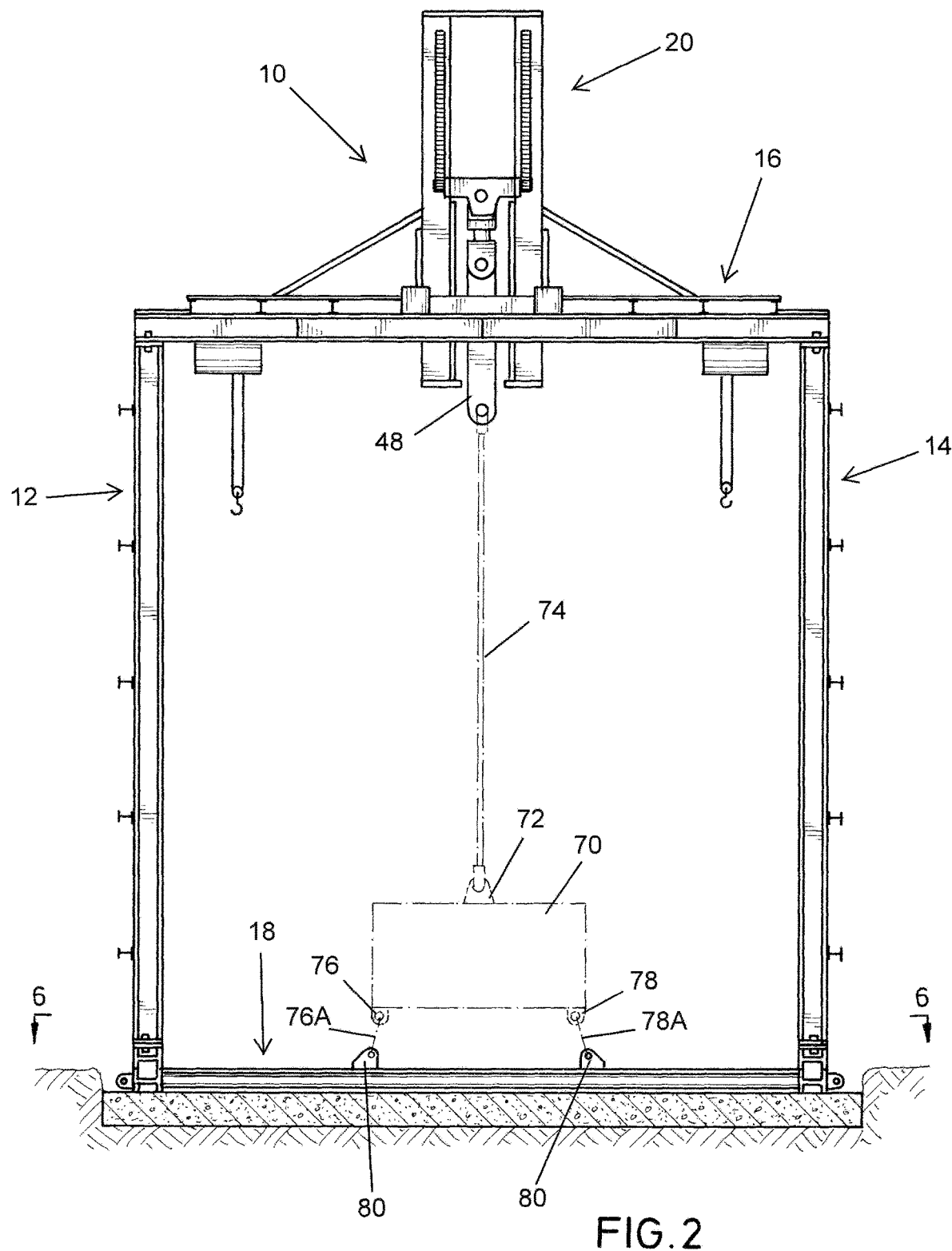
FIG. 2 is an end, elevational view of one embodiment of the apparatus of the present invention.
Figure 3:
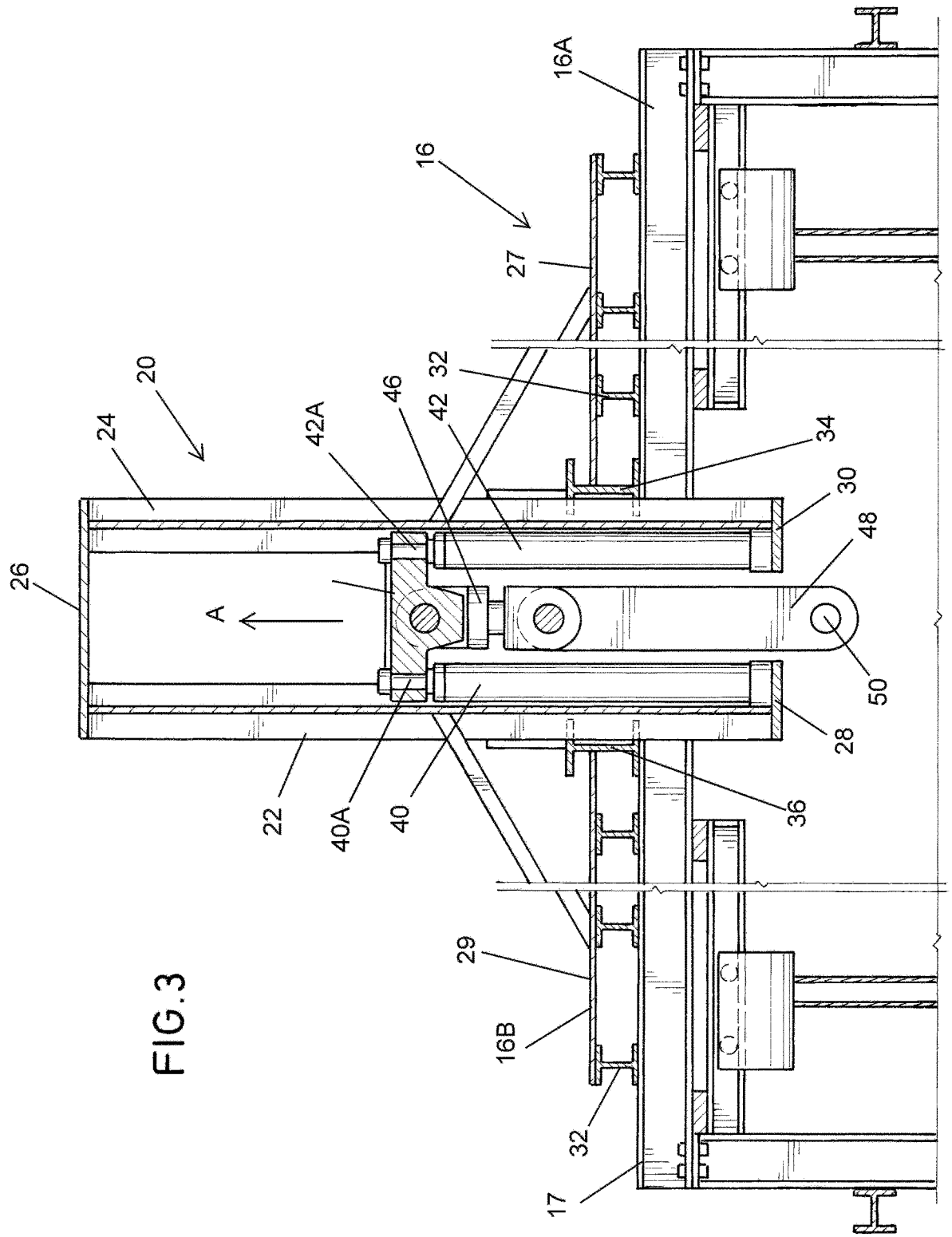
FIG. 3 is an enlarged, elevational view, partly in section, of the upper portion of the apparatus shown in FIG. 2.

Turning now to FIGS. 2-5, it can be seen that frame assembly 16 comprises a sub-structure 16A comprising a beam 17 on which is mounted a superstructure 16B, a tensioning assembly 20 being secured to superstructure 16B. Superstructure 16B, as best seen in FIG. 3, generally comprises plates 27 and 29 welded to I-beams 32, which in turn are welded to the top of beam 17.

Force generator/tensioning assembly 20 is operative to apply an upward force to a workpiece positioned between and connected to tensioning assembly 20 and base 18 and can be comprised of spaced I-beams 22 and 24, I-beams 22 and 24 being attached to one another by a top plate 26, there being bottom plates 28 and 30 connected to the bottoms of I-beams 22 and 24, respectively.

A pair of hydraulic cylinders 40 and 42 having piston rods 40A and 42A are secured to plates 28 and 30, respectively, the hydraulic cylinders 40 and 42 being oriented such that piston rods 40A and 42A move upwardly out of the cylinders 40 and 42 when hydraulic pressure (from a source not shown) is supplied below the pistons to which rods 40 and 42 are connected. Thus, the entire piston area is subject to the force of the hydraulic pressure.

Piston rods 40A and 42A are connected to a T-bar 44 which in turn is connected via a coupling 46 to a hook assembly 48, hook assembly 48 having a hole 50 for cable or the like.

As shown in FIG. 2, a workpiece 70 having a padeye 72 is connected by a cable 74 to hook assembly 48. Workpiece 70 is also provided with padeyes 76 and 78 which in turn are connected by cables 76A and 78A to anchors 80 respectively. It will thus be appreciated that when hydraulic pressure from a source (not shown) is applied to the pistons of cylinders 40 and 42, piston rods 40A and 42A will be moved upwardly in the direction of arrow A tensioning cables 74, 76A and 78A. The cables are flexible in the sense that they can be formed into loops or the like but generally have ultimate tensile strength sufficient to accommodate the loads to which they are subjected pursuant to their use in the present invention. In practice, the cables, wires, ropes, etc. will be chosen as to size, minimum breaking strength, and other relevant parameters so as to withstand the loads to which they will be subjected. In practice, the cables are tensioned to a predetermined amount sufficient to ensure that padeye 72 will not shear or break away from workpiece 70, thus ensuring that padeye 72 and its connection by welding or the like to workpiece 70, has sufficient structural integrity to withstand lifting forces applied to padeye 72 while workpiece 70 is being lifted.

As best seen in FIGS. 4 and 5, tensioning assembly 20 is provided with two rack and pinion assemblies 90 and 92. The pinions of rack and pinion assemblies 90, 92 are mounted on a shaft 94 which is journaled in flanges 44A and 44B of T-bar 44. Thus, the pinions and the connecting shaft 94 are movable with T-bar 44. The racks of the pinion assemblies 90 and 92 are fixedly connected to beams 22 and 24 and have equally spaced teeth. Since the pinions and the piston rods 40 and 42 are connected to the T-bar 44, movement of the piston rods 40 and 42 results in movement of the pinions on the racks. This is an important feature as it ensures that as piston rods 40 and 42 extend, they move at the same speed because of engagement during movement of the equally spaced teeth of the racks with the pinion teeth, thus ensuring that the pistons do not become canted. Also connected to T-bar 44 are rollers 100 and 102 which engage and move on I-beams 22 and 24 as T-bar 44 moves up and down.

Figure 6:
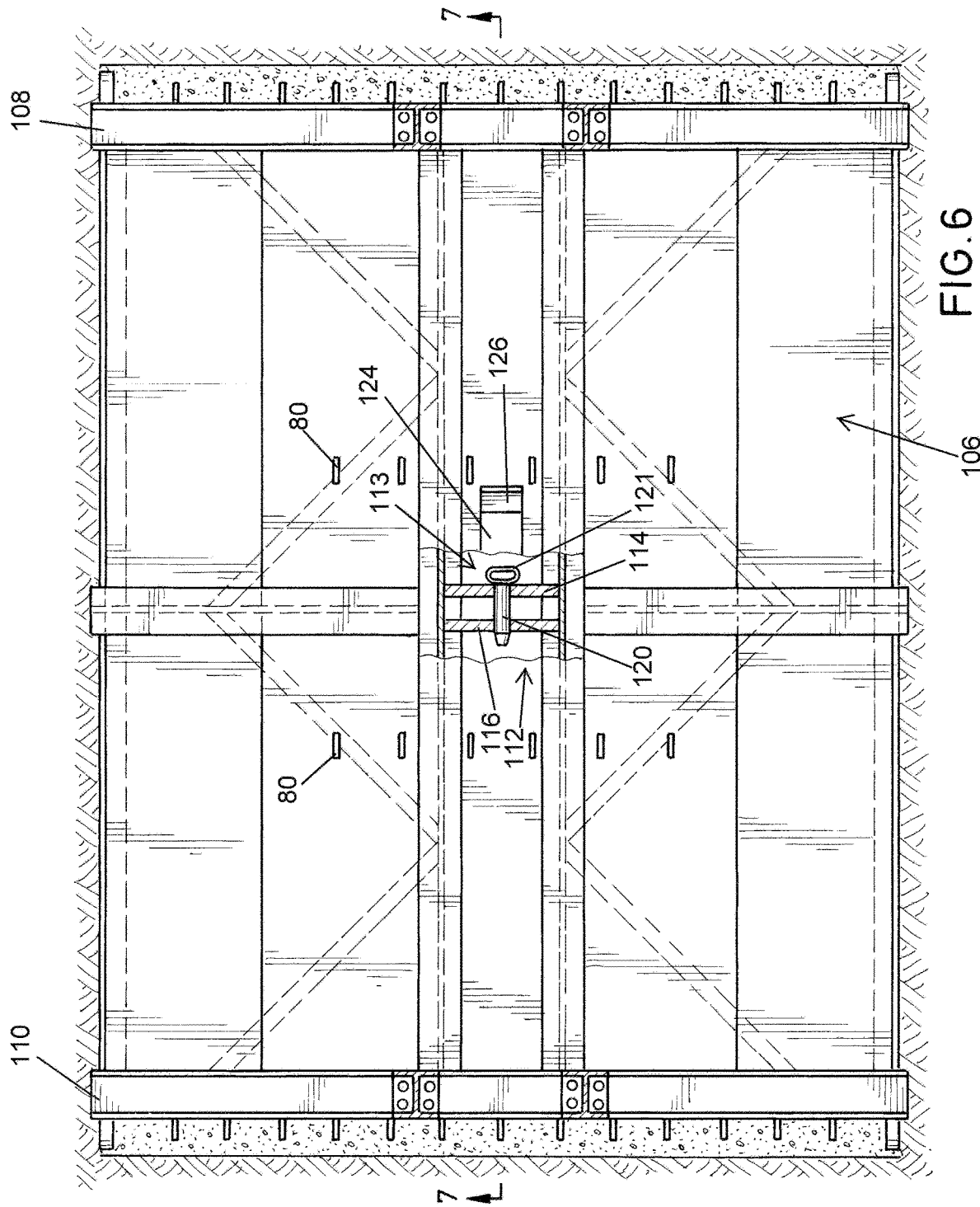
FIG. 6 is a top plan view taken along the lines 6-6 of FIG. 2.

Turning now to FIGS. 6, 7, and 8, a base and anchor assembly usable in the apparatus of the present invention is shown. The base shown generally as 18 is fixed and can include a concrete pad 104 on which is positioned a platform shown generally as 106. By "fixed" is meant that the base is capable of withstanding upward tension forces applied by the apparatus of the present invention without moving. Platform 106 comprises end beams 108 and 110 and center I-beams 112 and 113 having webs 114 and 116. Webs 114 and 116 have registering holes for receipt of a load bar or shaft 120, load bar or shaft 120 having a handle 121. There is an access opening 124 in plate 111 having a hinged door 126, which when opened as shown in FIG. 7, allows the handle 121 of load bar 120 to be accessed and moved into and out of the registering holes in webs 114 and 116. Accordingly, an eye hook or any similar connecting device can be placed in the access opening 124 when load shaft 120 is removed. Shaft 120 can then be repositioned in the registering holes through an eye or opening in the eye hook whereby the eye hook is in a position secured to platform 106 by load shaft 120. In addition to the anchor formed by load shaft 120 in connection with platform 106 as described above, there are a plurality of other anchors 80 formed by padeyes secured to platform 106.

Figure 9:
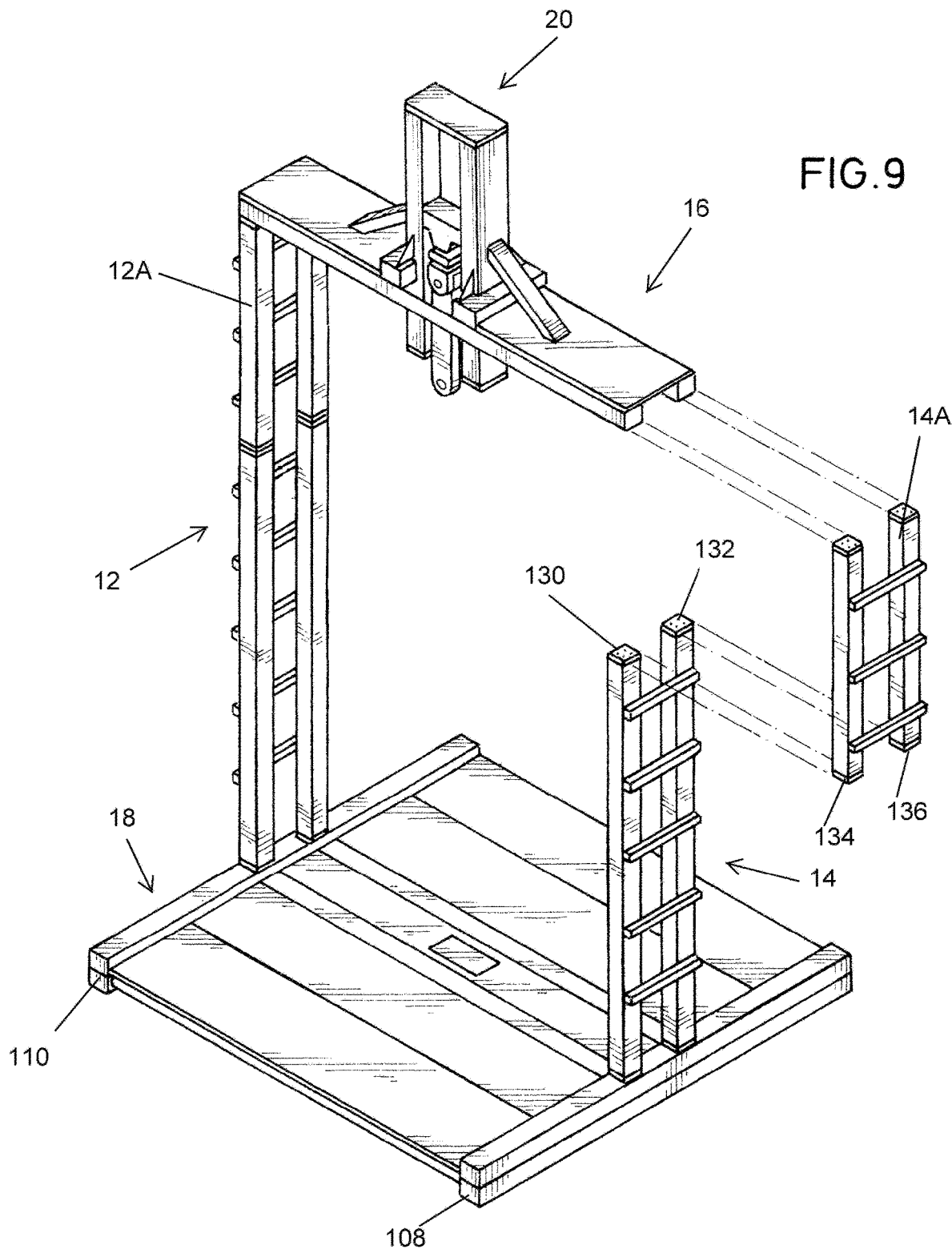
FIG. 9 is a perspective view, partially exploded, to show how the height of the apparatus of the present invention can be adjusted.

FIG. 9 depicts how the height of the apparatus of the present invention can be raised or lowered. In this regard, side frame members 12 and 14 can be modular in that they can have sections 12A and 14A which can be selectively added or removed as desired. To this end, the upper ends of side frame members 12 and 14 have a projecting formation 130 having chamfered sides 132 which can be received in a complementary shaped socket formed in the bottom plates 134 and 136 of modular sections 12A and 14A. In other words, the sections fit together much like a ball and socket arrangement.

Figure 10:
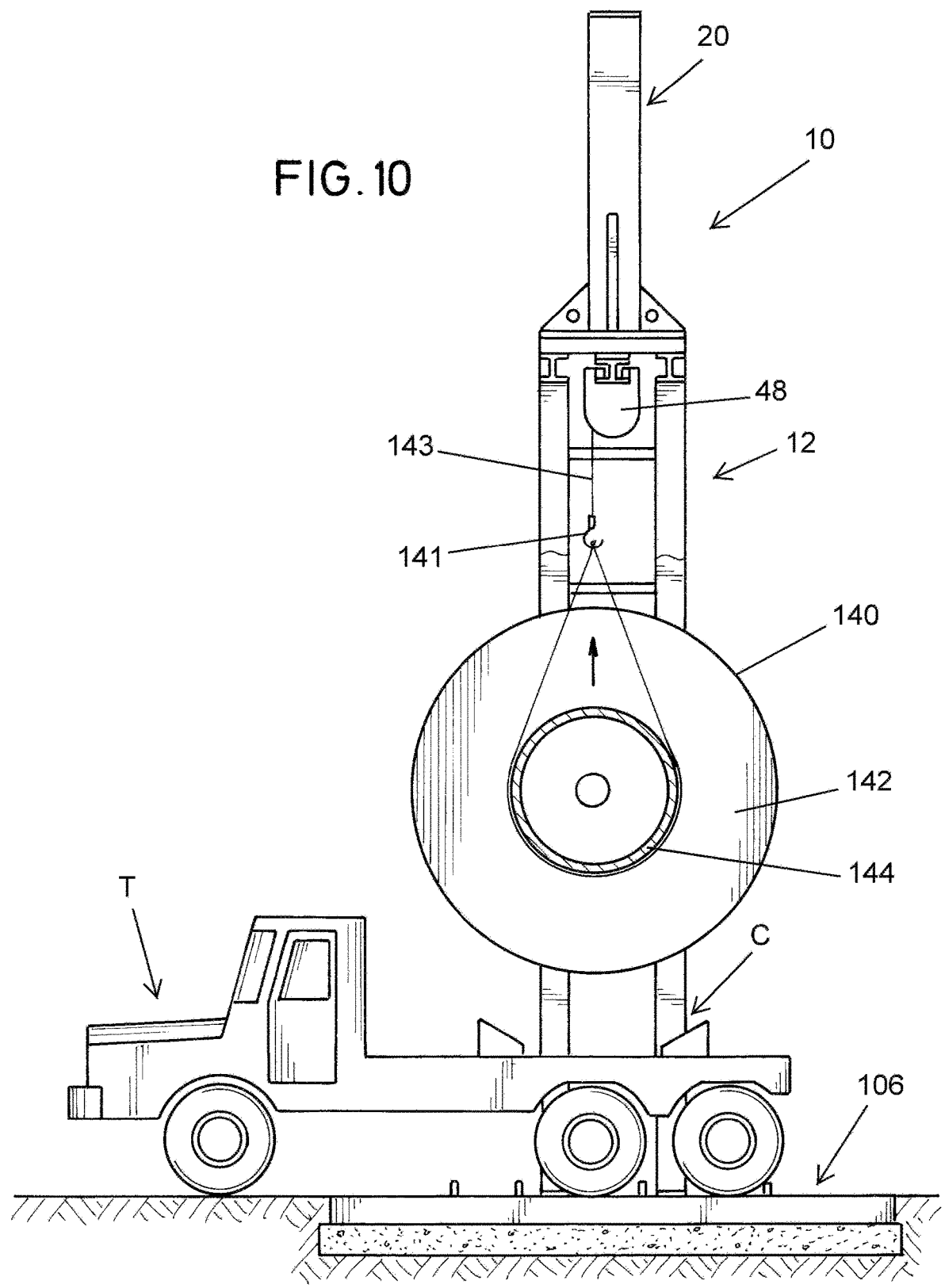
FIG. 10 is an environmental view showing a truck carrying a coil reel to be tested with the apparatus of the present invention.

Turning now to FIG. 10 there is shown a reel 140 suspended by a hook 141 and cable 143 from tensioning apparatus 20. As can be seen, reel 140 has been removed from the cradle C on the bed of a truck T. In this regard, the vertical design of the apparatus of the present invention allows a truck carrying a workpiece to be driven onto the base, whereby the workpiece can be unloaded, tested, and then reloaded. Reel 140 is of typical design, having side rims only one of which 142 is shown, and a center, hollow core 144. Reel 140 can be of a type designed to carry long lengths of flexible material such as steel cable, fiber optic cable, etc. Such reels can have a drum diameter up to ten feet and greater. It will be appreciated that when a cable or the like is wound onto the core 144 until the reel 140 is full, the weight of the cable on the core 144 can be considerable. Again, this is a function of the size of cable, the diameter of the core, and other factors. In any event, it is known that the force from the weight of the cable on the drum, can collapse the core 144. Accordingly, it is desirable that the core be tested to ensure it can withstand the forces exerted on the core by the wound cable.

Figure 11:
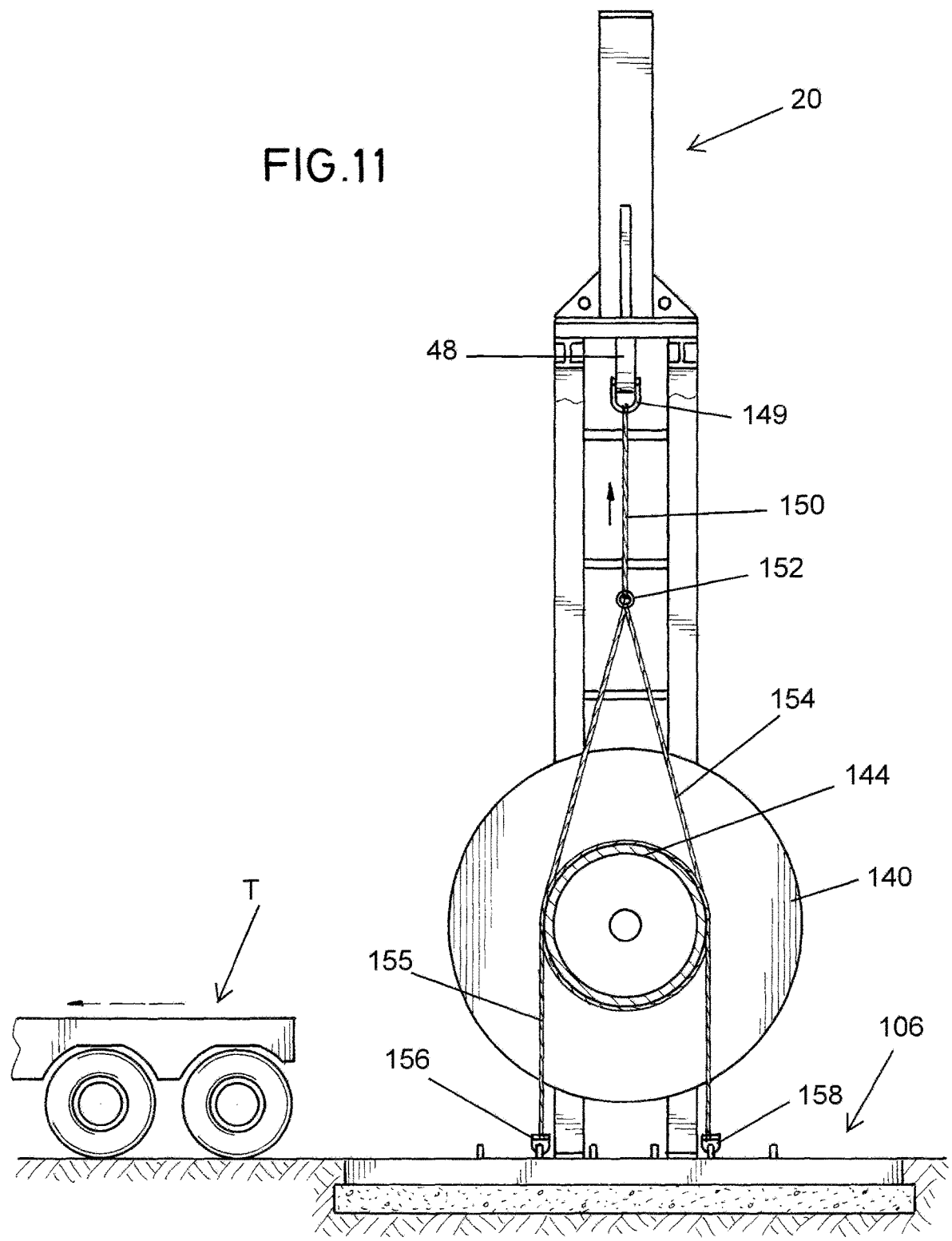
FIG. 11 shows the reel shown in FIG. 10 being tested with the apparatus of the present invention.

To this end, reference is now made to FIG. 11. A hoisting cable section 150 is connected between hook 48 via link 149 and second link 152. A loop of cable 154 encircles core 144 and is also connected to link 152. A second loop of cable 155 encircles core 144 and is connected to anchors 156 and 158 connected to platform 106. When the cylinders in tensioning assembly 120 are activated, cable 150 moves upwardly in the direction shown by the arrow, tensioning cable loop 154 around drum 144. At the same time, loop 155 is also tensioned around core 144. The net result is that there is substantially a radially inwardly directed force exerted substantially circumferentially around core 144. The tensioning assembly can be used to tension the loops 154 and 155 and exert the desired predetermined amount of collapse force on core 144.

Figure 12:
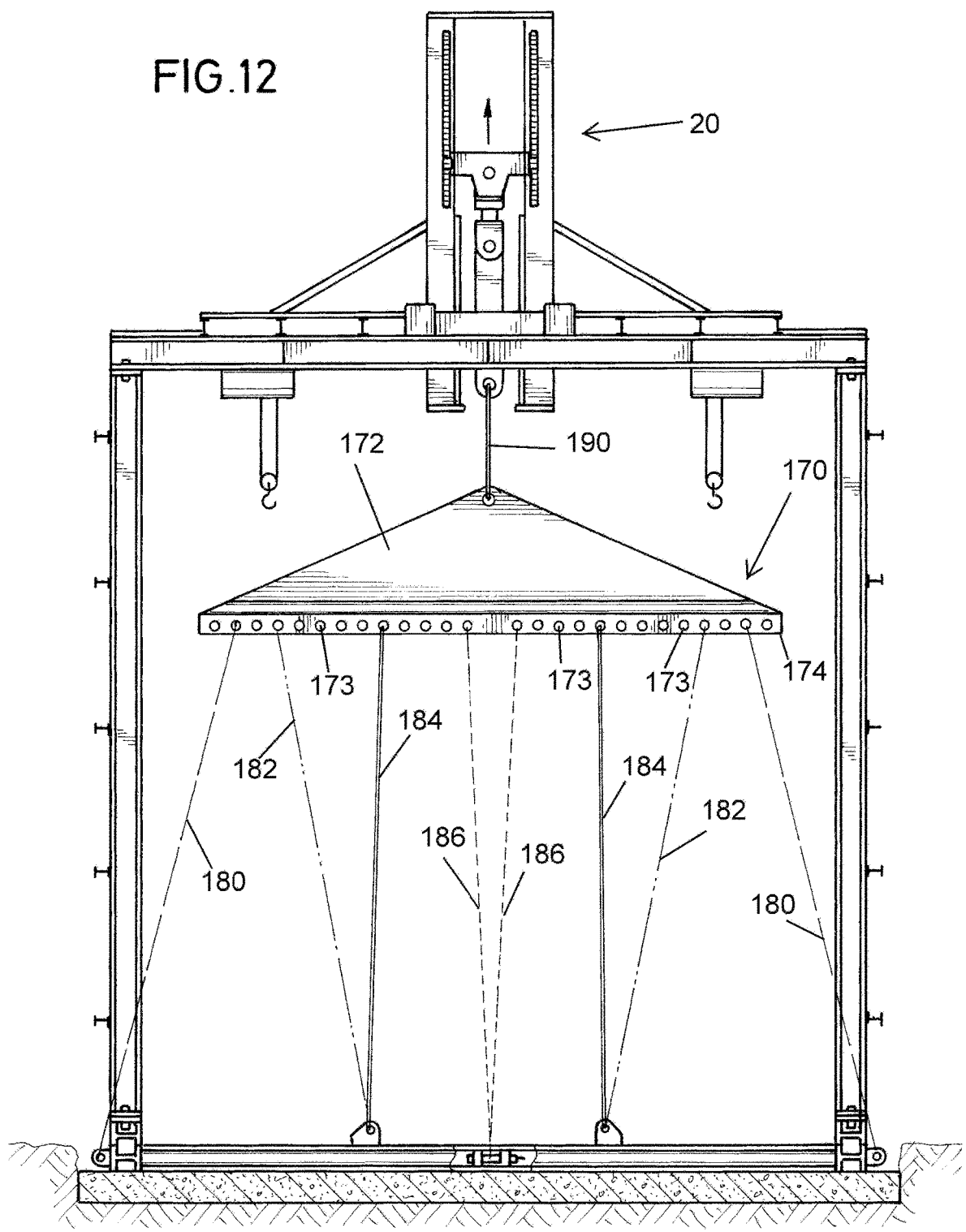
FIG. 12 shows the apparatus of the present invention testing a triangular lifting beam.

Turning now to FIG. 12, the apparatus of the present invention is shown testing the connection holes on a triangular spreader beam shown generally as 170. Spreader beam 170 has a plate portion 172 and a bottom rib 174 provided with a plurality of attachment holes 173 to which a connection link, e.g., a hook, can be attached. In testing spreader beams, it is necessary that the lifting holes be tested in pairs. In this regard, each of the pairs is spaced an equal distance from the centerline of the spreader bar. As can be seen in the depiction of FIG. 12, four pairs of connecting holes are being tested, indicated by the lines 180, 182, 184, and 186. When the pistons in tensioning assembly 20 are actuated as shown by the arrow, tension is transferred through cable 190 and through spreader bar 170 to the various sets of cable 180-186 to test the structural integrity of the attachment holes 173 and specifically the structural integrity of the rib 174.

Turning now to FIGS. 13 and 14, there is shown a spreader bar 200 being tested by the apparatus of the present invention. Spreader bar 200 has two upper lifting eyes 202 and 204 and two lower lifting eyes 206 and 208. A cable 210 is connected between hook 48 and lifting eye 202, while a second cable 211 is connected to lifting eye 204 and hook 48. Cables 210 and 211 are connected to lifting eyes 202 and 204, respectively, by bolt type anchor shackles 202A and 204A. Lifting eye 206 is connected to an anchor 80 via cable section 212 and a bolt type anchor shackle 206A. In like fashion, lifting eye 208 is connected to an anchor 80 via cable section 214 and a bolt type anchor shackle 208A. It will be appreciated from the above discussion that tensioning assembly 20 can apply a tensioning force to all of the lifting eyes on spreader bar 200 to the desired degree.

Figure 15:
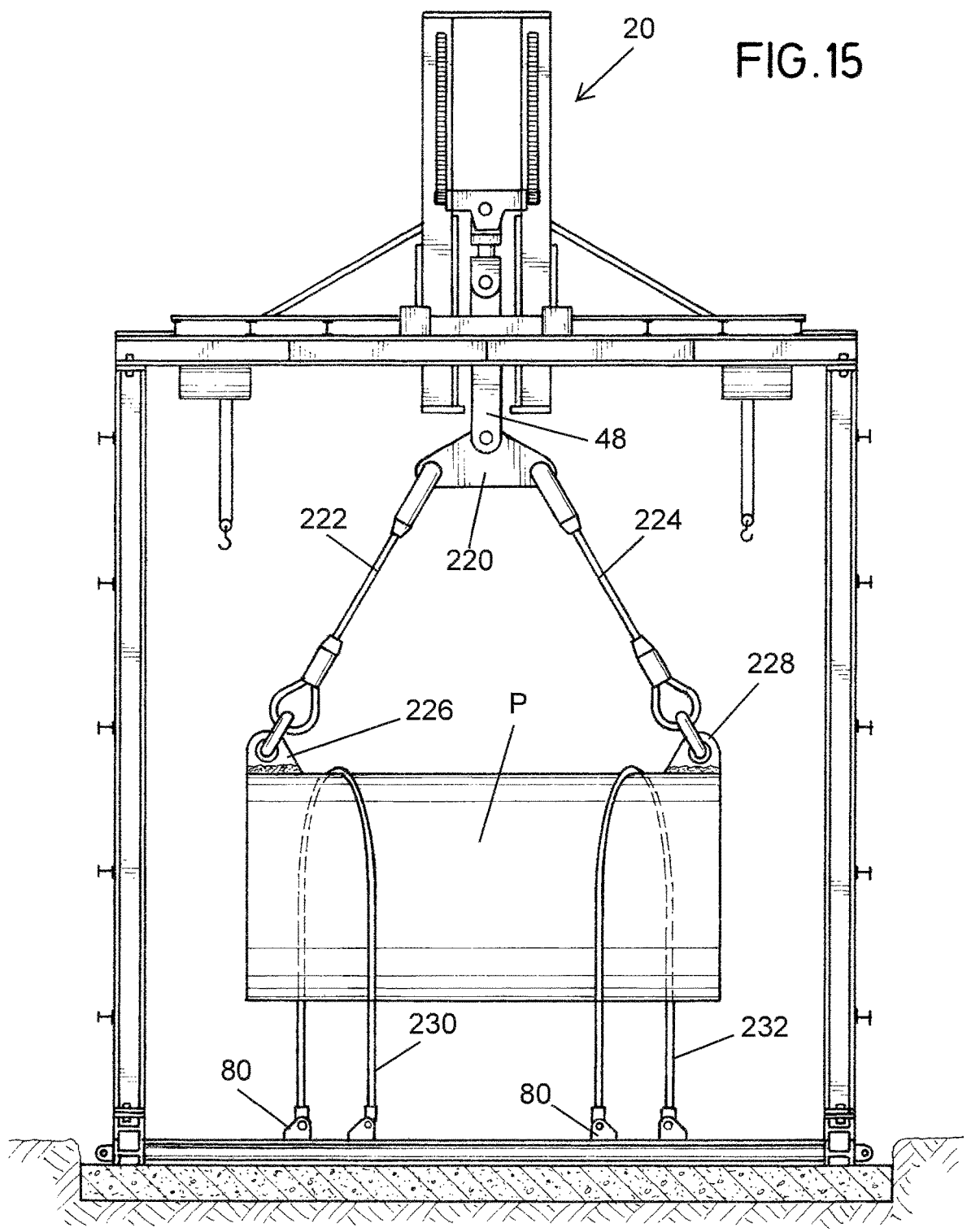
FIG. 15 shows the apparatus of the present invention testing a section of a large diameter tubular member, as for example, a section of pipeline pipe.

FIG. 15 shows the apparatus of the present invention testing padeyes welded to a large cylindrical workpiece such as a section of pipeline pipe P. Hook 48 is connected to a spreader bar 220. A pair of linkages 222 and 224 connect spreader bar 220 to padeyes 226 and 228, respectively, which are welded to pipe P. Cable loops 230 and 232 are connected to anchors 80. In the manner described above, when the piston rods of the cylinders, are extended, linkages 222, 224, and cable loops 230, 232 are placed in tension, applying a tensile force to padeyes 226 and 228, the force being applied to a predetermined level.

It will be understood that in measuring various forces on a workpiece that can be exerted using the apparatus of the present invention, a variety of devices for measuring force/weight can be employed. In particular load cells which measure compression, tension, bending, or shear forces can be employed. Non-limiting examples of load cells that can be employed include compression load cells, tension load cells, tension and compression load cells, beam load cells, load measuring shackles, load measuring pins, load monitoring links, etc. The type of load cell or other force/weight measuring device will be dependent upon the type of workpiece, or portion thereof, which is being tested.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An apparatus for applying a force to a workpiece comprising:
    a frame comprising first and second spaced, vertically extending side members and a top frame assembly connected to said first and second side members to form a generally inverted U shape;
    a fixed base downwardly spaced from said top frame assembly;
    an anchor operatively attached to said base;
    a force generator mounted on said top frame assembly and adapted to generate a tensioning force on a workpiece positioned between and connected to said force generator and said anchor; and
    a first flexible linkage connectable to said workpiece and said force generator.

2. The apparatus of claim 1 further comprising:
    a second flexible linkage connectable to said workpiece and said anchor.

3. The apparatus of claim 1, further comprising a plurality of anchors attached to said base.

4. The apparatus of claim 1, wherein said side members are attached to said base.

5. The apparatus of claim 1, wherein said side members are adjustable in height.

6. The apparatus of claim 1, wherein said force generator comprises a rod upwardly movable relative to said base.

7. The apparatus of claim 1, wherein said force generator comprises a first hydraulic piston cylinder assembly having a first piston and a first housing forming a first piston cylinder, said first housing being interconnected to said top frame assembly.

8. The apparatus of claim 7, wherein said tensioning assembly comprises a second hydraulic piston cylinder assembly having a second piston and a second housing forming a second piston cylinder, said second housing being interconnected to said top frame assembly.

9. The apparatus of claim 8, wherein said first and second pistons are connected to a T-bar, said T-bar being movable upwardly in response to upward movement of said first and second pistons.

10. The apparatus of claim 8, wherein there are first and second toothed racks mounted on first and second stanchions, respectively, and there are first and second pinions engageable with said first and second racks, respectively, said first and second pinions being rotatable mounted on said T-bar for simultaneous movement in response to movement of said first and second pistons.

11. The apparatus of claim 10, wherein said first and second racks have vertically displaced, equally spaced teeth, whereby said first and second pistons are caused to move at a constant speed in response to engagement of the teeth of said first and second pinions with said first and second racks, respectively.

12. The apparatus of claim 1, wherein said base has a generally central opening therein, a framework including first and second spaced webs being accessible through said opening, said first and second webs having registering bores, a load pin being selectively movable in and out of said registering bores.

13. The apparatus of claim 1, comprising a hook assembly operatively attached to said force generator, said first flexible linkage being attachable to said second flexible linkage.

* * * * *